UNITED STATES PATENT OFFICE.

ARTHUR CLAUDE BRADEN, OF PASADENA, CALIFORNIA.

MANUFACTURE OF LEMONADE-POWDER.

1,278,297. Specification of Letters Patent. Patented Sept. 10, 1918.

No Drawing. Application filed August 7, 1916. Serial No. 113,502.

*To all whom it may concern:*

Be it known that I, ARTHUR CLAUDE BRADEN, citizen of the United States, residing at Pasadena, in the county of Los Angeles and State of California, have invented a certain new and useful Improvement in the Manufacture of Lemonade-Powder, of which the following is a full, clear, concise, and exact description.

It has been found desirable to include the lemon peeling with the juice of the lemon in making lemonade. In this way a certain aroma is given to the drink which has been found attractive to the users. My lemonade powder is so prepared that there is no chemical action produced between the sugar, the juice and the lemon peeling. I am thus enabled to place upon the market a powder which contains no substance except the chemically unchanged lemon mixed with sugar.

I do not know of any successful introduction upon the market of a lemon powder of the character which I describe, nor of the successful manufacture of a lemon powder in which practically the entire oil containing part of the peel and juice of the lemon have been utilized. By proceeding as I will now describe, I have found that a most satisfactory and permanent lemon powder is produced which may be sold at a comparatively moderate price, and used in the manufacture of lemonade to give satisfaction equal, if not superior, in quality and taste to that made in the usual way.

I first grate or peel the lemon in a satisfactory way by hand or machine. It is the external surface of the peeling which contains the oil cells which is removed. These peelings I reduce to a pulp by grinding or rolling or by both grinding and rolling. If the lemon has been cured sufficiently, this reduction may be proceeded with at once by rolls such as are used in the manufacture of cocoa or chocolate or by other well known machines. Otherwise it is desirable to dry the peel to a moderate extent before grinding. Ordinarily, after the peelings are subjected to a current of air in a suitable drier for half an hour, they will be in condition to be ground. When ground the peelings will be of a paste like consistency. I then proceed to mix the ground peel with sugar and I have found that the proportion of one ounce of this peel to a pound of sugar is most satisfactory. The sugar and ground peel are then thoroughly mixed together by means of a mortar or other appliance. This mixture is now in a powdered form, being slightly damp, and consists simply of the ground outside of the lemon and sugar.

The juice of the lemon that has been peeled is extracted and prepared by first cutting the lemon into pieces, pressing out the juice, straining it and then subjecting the juice to an evaporating process until approximately 15/16 of the weight of the juice has been removed. It is then in a semi-solid state. This reduced juice is now in condition to be mixed with the sugar and powdered lemon peel which I have already described. I have found that approximately one ounce of this concentrated juice added to a pound of the previous mixture gives the most satisfactory result. It is a question of individual preference. This is the juice that gives the lemonade its tart or invigorating characteristic. This mixing of the juice thus reduced with the mixture of sugar and ground outside peel of the lemon I perform by stirring by hand or machine and working it in, or more technically, rubbing it in; the point being to mix evenly together the reduced juice and the sugar which has been already mixed with the ground peel. Any method of thoroughly mixing the constituent parts together may be employed.

After thus thoroughly commingling and uniting the juice, sugar and peel to form a homogeneous mixture, the product is subjected to a further drying process and then ground to form the commercial powder. The commercial powder thus formed is now ready for the market and is adapted to be put up in packages for sale. I have found that packages varying in size from 3½ ounces upward are convenient and in order that the powder may not be affected by exposure, I use glassine or other practically air tight containers.

Having thus described my invention I claim as new and desire to secure by Letters Patent—

1. A lemonade powder which consists in the combination of approximately 16 parts of sugar by weight with one part of the dried and ground outside peeling of the lemon, and one part of the juice of the lemon concentrated to one sixteenth of its original weight, substantially as herein described.

2. The method of producing a lemonade powder which consists in removing and grinding the outer portion of the lemon peeling, mixing said ground peel with sugar; extracting the juice from the lemon, concentrating the same and adding the juice thus concentrated to the sugar and peel, subjecting the product to a drying process and then grinding the product, substantially as described.

3. The article of manufacture consisting of the outside of the lemon peel suitably ground, the juice of the lemon and sugar, evaporated to form a solid cake.

In witness whereof, I hereunto subscribe my name this first day of August, A. D. 1916.

ARTHUR CLAUDE BRADEN.

Witnesses:
  FRANCES E. GOOD,
  L. L. TEST.